Patented Aug. 4, 1953

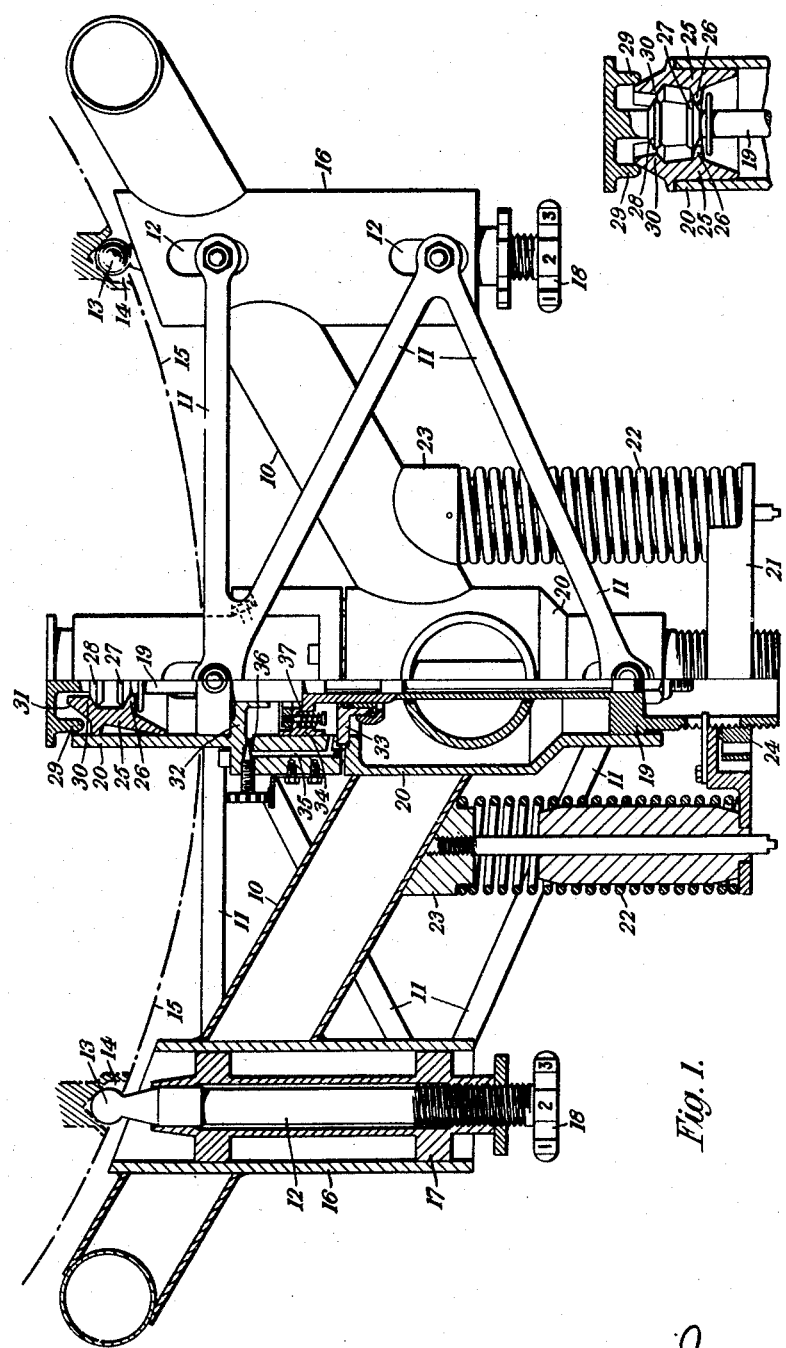

2,647,776

UNITED STATES PATENT OFFICE 2,647,776

RELEASABLE ATTACHMENT

Barnes Neville Wallis, Weybridge, England, assignor to Vickers-Armstrongs Limited, London, England, a British company Application December 12, 1950, Serial No. 200,328
In Great Britain October 19, 1949

7 Claims. (Cl. 287—124)

The object of this invention is to provide an improved releasable attachment which will be capable of automatic disconnection when a predetermined force tending to separate an attached body has been acting for a predetermined minimum period. Among the purposes to which such an attachment may be put is that of providing a temporary anchorage for an aeroplane upon a wheeled launching trolley or carriage, where it is essential that the attachment will securely hold the aeroplane upon the trolley in the position of take-off until the trolley has attained a speed at which the wing lift forces are sufficient to support the aeroplane in flight, and until such forces have been maintained continuously over a period of such duration as will ensure that they do not result merely from a gust acting on the aeroplane wings or a transient relaxation of the weight of the aeroplane due to the passage of the trolley over an irregularity in the surface of the aerodrome.

An attachment in accordance with this invention comprises a latch adapted to engage a detent on the attached object and to be disengaged to release the latter, a bolt operatively associated with said latch, means for applying to said bolt a loading force tending to hold the same yieldably in the latch-engaged position, and means for retarding the movement of the bolt towards the latch-released position such that said position is only reached after an externally applied force tending to disengage the detent from the latch and sufficient to overcome said loading force, has been acting for a predetermined period.

The said bolt-retarding means is arranged to act only in one direction of movement of the bolt, so that if said external force tending to release the latch should cease before the latch has been disengaged, the bolt will quickly be restored to its initial position by the operation of the loading force, and the latch will remain engaged.

Figures 3, 7:
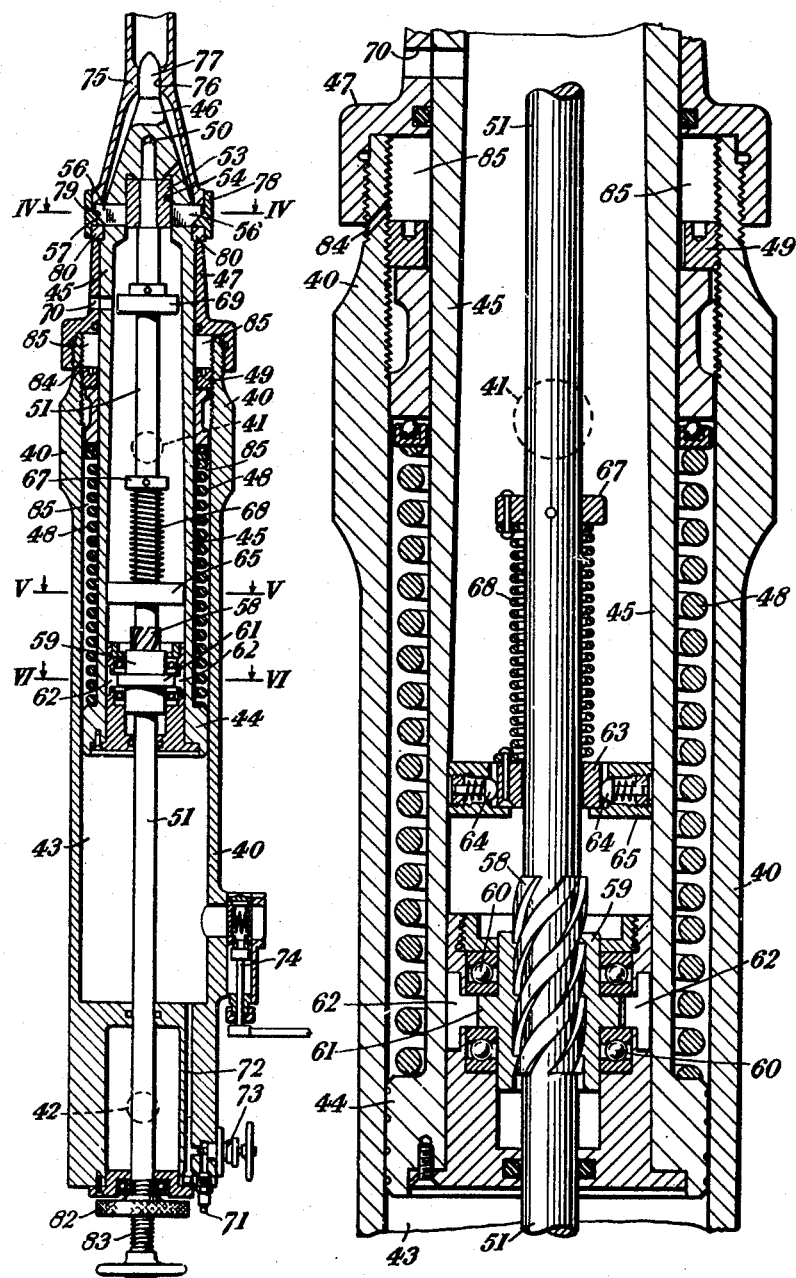

The manner in which the invention may be carried into effect is hereinafter described with reference to the accompanying drawings, which illustrate two alternative forms of anchorage of an aeroplane upon a launching carriage such as that which forms the subject of my co-pending United States patent application Serial No. 200,327, filed December 12, 1950. In said drawings Fig. 1 is a partly sectional elevation of the aeroplane-supporting cradle which forms part of the launching carriage, and Fig. 2 is a sectional detail view showing the relative positions of the parts of the lock in the released position. Figs. 3 to 7 illustrate a modified embodiment of the invention, Fig. 3 being a longitudinal section of said pillar and Figs. 4, 5 and 6 being transverse sections thereof on a larger scale, respectively taken on the lines IV—IV, V—V and VI—VI of Fig. 3. Fig. 7 is a large-scale detail of part of Fig. 3.

The embodiment shown in Fig. 1 comprises a transverse cradle 10 incorporated in the structure of the carriage (not shown), and a braced frame 11 mounted on said cradle, said frame 11 including at each side of the cradle a pillar 12 having at its upper extremity an upstanding pivot 13 on which the aeroplane may be supported by means of a socket 14 in the position appropriate to take-off, the underside of the body of the aeroplane being indicated at 15. The pillars 12 are slidably mounted in two vertical sleeves 16 which form part of the cradle 10 and the lower parts of the pillars are screw-threaded to cooperate with fixed nuts 17 so that a limited degree of initial adjustment of the frame in relation to the cradle may be obtained by regulating the hand-wheels 18 on the pillars. Attached to the centre of the frame 11 is a bolt 19 slidably mounted in a vertical housing 20 forming part of the cradle 10, and at the lower extremity of said bolt 19 is a cross-member 21 which serves as an abutment bearing at each end upon the end of a spring 22 compressed between said abutment and a seating 23 on the underside of the cradle, the arrangement being such that the springs 22 strain the bolt 19 in a downward direction. The position of the cross-member on the bolt may be adjusted by means of a nut 24 for the purpose of varying the degree of downward pressure exerted on the bolt 19 by said springs 22.

The bolt housing 20 is extended upwardly in the form of a sleeve enclosing the latch. The latch takes the form of a plurality of segments 25 which are collectively of annular form, presenting an inwardly projecting shoulder 26 which is received beneath a mushroom-shaped head 27 on the bolt 19 when the latch is engaged.

The aeroplane is furnished on the underside of its fuselage with a detent constituted by a downwardly projecting member having the form of an inverted mushroom 28 and a depending annular flange 29 concentric about the mushroom 28. The latch segments 25 are also flanged so that they collectively present a second inwardly facing shoulder 30 adapted, when the latch is engaged, to be received behind the upper side of the inverted head of the mushroom detent 28 on the aeroplane, and the segments 25 are maintained in the engaged position by their enclosure within the sleeve of the bolt housing 20. When the bolt 19 is released, an upwardly acting force tending to raise the aeroplane will first cause the detent 28 to raise the latch segments 25 until they are free of the end of the sleeve 20, when they will be able to expand sufficiently to disengage the detent 28, enabling the aeroplane to rise freely from the trolley. This position of the parts of the latch at this stage is shown in Fig. 2.

The initial engagement of the detent 28 is made by the downward pressure of the depending annular flange 29 against suitably inclined outer faces 31 on the latch segments 25, whereby the latter are caused to close upon the mushroom detent 28.

In use, the carriage is propelled along the ground until the airspeed is such that the lifting forces acting on the wings have attained a value exceeding the total represented by the weight of the aeroplane and the downwardly acting loading forces applied by the compressed springs 22 to the bolt 19, when upwardly directed forces acting on the bolt 19 draw the latter upwardly, expanding the latch segments 25 and releasing the aeroplane for take-off. In order however to prevent the detent from being prematurely released by the upwardly acting force of a gust or the momentary relaxation of the weight of the aeroplane on its mounting due to the passage of the carriage over an uneven part of the aerodrome, a dash-pot is operatively connected with the bolt 19 in such manner that its movement towards the released position will take a certain minimum period of time, say ten seconds. Thus, the aeroplane can only be released after the forces acting on its wings have exerted a continuous lift for that period. The dash-pot is constituted by a part of the housing 20 which is enclosed by two spaced parts 32 and 33, forming a cylinder in which a piston 34, fixed on the bolt 19, is arranged to work. The cylinder is filled with oil and the respective ends of the cylinder are connected by a transfer duct 35 governed by a needle-valve 36. Thus, the rate of upward movement of the bolt 19 is dependent upon the setting of the valve 36. The dash-pot is arranged to operate only in one direction in order that the bolt 19 will immediately be restored to its initial position by the loading springs 22 as soon as any merely transient lifting force has ceased. For this purpose a one-way valve 37 is provided in the piston 34, the oil in the cylinder passing freely through the valve 37 when the bolt 19 moves downwardly.

The modified form of releasable attachment which is illustrated in Figs. 3 to 7 of the accompanying drawings has been designed especially for use in conjunction with the particular form of launching carriage which is described and illustrated in the specification of United States patent application Serial No. 200,327, the attachment being incorporated in the structure of the single vertical pillar upon which the aeroplane is supported in that case. In Fig. 3 the said vertical pillar is indicated at 40, the points at which it is pivotally connected to the parallel links of the frame by which the pillar is supported on the carriage being marked by the numerals 41 and 42.

The pillar 40 encloses for the greater part of its length a cylinder 43 which houses a piston 44 having an upward tubular extension 45 which protrudes beyond the top of the cylinder where it is formed integrally with a spigot 46 the longitudinal axis of which coincides with that of the cylinder 43. The upper end of the cylinder is provided with a sleeve-like cap 47 fitting closely against the piston extension 45. A helical spring 48 (hereinafter called the "main spring") is fitted about the extension 45 and is adapted to be compressed between the upper face of the piston 44 and an annular nut 49 which screws into the upper part of the bore of the cylinder 43. The nut 49 is adjusted until the axial force exerted by the compressed spring 48 is equal to the weight of the aeroplane to be launched.

Passing co-axially through the pillar 40 and the piston 44, and extending into a co-axial cavity 50 bored in the underside of the spigot 46, is a shaft 51 bearing at its lowest extremity a handwheel 52 and pinned at a point near its upper extremity to a cam 53 which is arranged to rotate in a counter-bored cavity 54 in the spigot 46. Said cam 53 is of the peculiar shape illustrated in Fig. 4, having two diametrically opposed lobes 55 fashioned with part-cylindrical faces which make rotary sliding contact with the cylindrical bore of the spigot cavity 54. Opposite said cam the spigot 46 is slotted diametrically to house on either side of the cam a pair of slidable latches 56 which are chamfered on the undersides of their outer ends, as shown at 57, for the purpose hereinafter explained.

Figure 6:
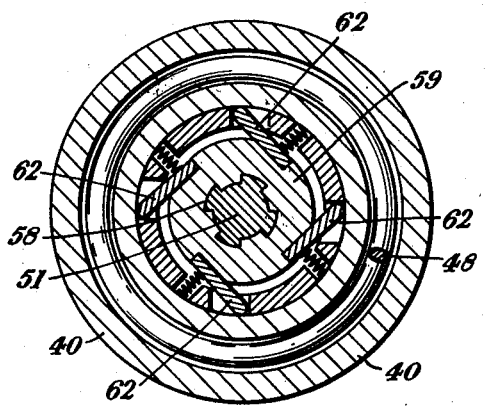

The shaft 51, termed the "cam-shaft," is provided with a multiple quick thread 58 which mates with a correspondingly threaded nut 59 rotatably mounted in the piston 44 between two thrust-bearings 60, 60. The nut 59 includes a ratchet 61 the notches of which are engaged by four spring-loaded pawls 62 carried by the piston in such fashion as to permit rotary motion of the nut in relation to the piston only in a clockwise direction as seen in Fig. 6.

The spigot assembly, comprising the spigot 46, the piston 44 and the piston extension 45, collectively constitutes the "bolt" of the attachment, the operative connection between said bolt and the latches 56 being provided by the cam-shaft 51 and the mechanism associated therewith.

Figure 5:
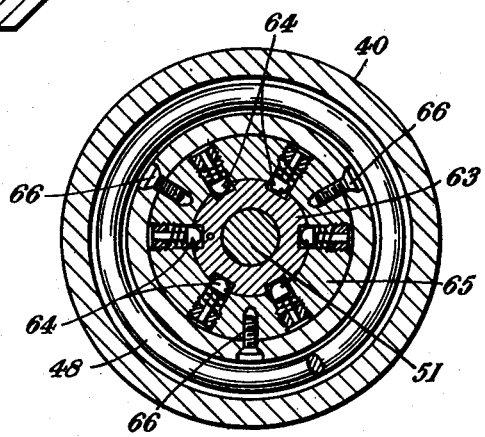

Above the piston the cam-shaft 51 is coupled to the piston extension 45 by a clutch comprising an element 63 mounted on the shaft and the peripheral surface of which is corrugated axially to cooperate with a plurality of radially spaced spring-pressed shoes 64 which are adjustably housed in an annulus 65 which is itself attached to the interior of the extension 45 by screws 66 (Fig. 5). Compressed between the upper face of the element 63 and a collar 67 pinned to the cam-shaft 51 is a light spring 68.

Near to its upper end the cam-shaft 51 carries a fixed collar 69, called the "register collar," on the rim of which are engraved a horizontal index mark and a vertical index mark which can be viewed through an inspection hole 70 drilled through the side of the cap 47 and the wall of the extension 45.

At the base of the pillar is provided a compressed air supply connection 71, which communicates with the interior of the cylinder 43 beneath the piston 44 by a duct 72 controlled by a valve 73. An exhaust valve is provided at 74.

Figure 4:
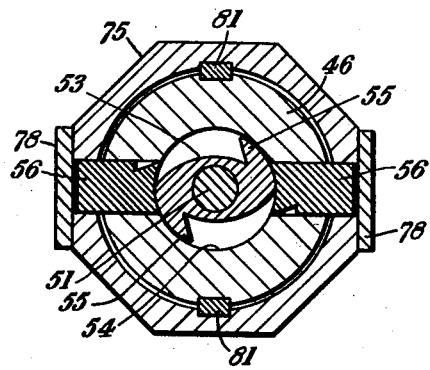

The aeroplane is provided as a part of its structure with an inverted conical socket 75, the upper part of which is drilled at 76 to receive the cylindrical extremity 77 of the spigot 46, and which bears on its lower rim a member 78 furnished internally with a chamfered face 79 and terminating in a seating nut 80. (The member 78 constitutes the detent on the attached object, i. e. the aeroplane, which is engaged by the latches 56.) The socket 75 is arranged to be located with respect to the longitudinal axis of the pillar when lowered upon the spigot 46 by a pair of keys 81 which are received in key-ways provided in the contacting faces of the socket and the spigot (Fig. 4). A nut 82 is mounted on a threaded part 83 of the cam-shaft 51 between the hand-wheel 52 and the base of the pillar.

Preparatory to lowering the aeroplane on to the launching carriage, the exhaust valve 74 is closed, a source of compressed air is attached to the connection 71 and the valve 73 opened, so that the air entering the cylinder 43 forces the piston 44 upwards. The piston is allowed to rise, taking with it the cam-shaft 51, until the horizontal index mark on the rim of the register collar 69 arrives opposite the centre of the inspection hole 70. The compression of the spring 68 ensures that the upper end-face of the cam 53 is in contact with the upper end of the bore 54 in the spigot 46 and therefore that the thread 58 on the cam-shaft is in correct registration with the nut 59. Visual inspection will show that the latches 56 are retracted to their inmost position, in which they are held by their engagement by the claw-like edges of the lobes 55 of the cam 53.

The aeroplane is lowered so that the socket 75 passes over the spigot 46, the part 76 of the latter entering the bore 75 and the keys 81 guiding the socket into its correct position in relation to the axis of the pillar, until the seating nut 80 rests upon the upper rim of the cap 47, as shown in Fig. 3.

The cam-shaft 51 is then rotated by the hand-wheel 52 through approximately 90° in a clockwise direction looking downwards. This action causes the lobes 55 of the cam 53 to push the latches 56 outwardly until their chamfered faces 57 make contact with the similar faces 79 on the member 78, which is fixed to the aeroplane socket 75. Verification that the latches are fully engaged is made by ascertaining that the vertical index mark on the rim of the register collar 69 is seen at the centre of the inspection hole 70. The valve 73 is now closed, the air supply disconnected from the inlet 73, and the valve 74 is opened, discharging the air in the cylinder 43 to exhaust.

Preparatory to take-off, the nut 82 is screwed up until it abuts against the base of the pillar 40, as in Fig. 3, leaving the cam-shaft 51 free to rotate but preventing it from rising when the spigot 46 and piston 44 are raised. As the launching carriage gains speed the lifting force developed by the wings is transmitted through the socket 75 and the latches 56 to the spigot 46 and piston 44, tending to force the latches 56 inwardly. When the carriage speed has increased to the point at which the lifting force exceeds the weight of the aircraft, the spring 48 commences to compress, so that the spigot 46 and piston 44 together with the quick-thread nut 59 rise, the axial movement of the latter causing the cam-shaft 51 to rotate, rotation of the nut in the opposite direction being prevented by the ratchet and pawl mechanism 61, 62. When the excess lift attains the predetermined margin over the weight of the aeroplane, the spring 48 will have been compressed sufficiently to produce a 90° rotation of the cam 53, so that the latches 56 are free to travel inwardly under the pressure of the chamfered surface 79 on the socket annulus 78 and, the socket 75 being now disconnected from the spigot 46, the aeroplane will take off in free flight.

The delay in operation necessary to preclude the release mechanism from being operated by a transient gust, or by a momentary relaxation of the weight of the aeroplane due to an upward bump on the carriage, is ensured by the retarded escape through the small orifice 84 of the column of air above the piston 44, which air is forced by upward movement of the piston into the annular chamber 85 which surrounds the piston extension 45 within the upper part of the pillar 40.

As the aeroplane rises away from the carriage, the spring 48 retracts the piston 44 so that the spigot 46 is quickly withdrawn into the pillar, ensuring that it cannot come into contact with any part of the aeroplane before the latter has gained height. The piston 44 descends until it covers the outlet of the exhaust valve 74, when it will be arrested by the cushioning effect of the trapped air which is compressed in the base of the cylinder 43.

The latches 56 are again retained in the retracted position by the claw-like lobes 55 of the cam 53, which latter is held in place by the torsion of the spring 68. The clutch 63, 64 limits the torque so transmitted to the cam-shaft to a safe value and ensures that said spring 68 is not overloaded.

During the descent of the piston 44, the quick thread 58 on the cam-shaft 51 rotates the nut 59 in a clockwise direction (viewed downwards) and the cam-shaft 51 rises under the influence of the spring 68 to its initial position, such movement of the cam-shaft being damped by the compression of air trapped in the spigot cavity 50.

The aeroplane may be removed from the carriage when the latter is at rest, the nut 82 occupying the position shown in Fig. 3, by closing the exhaust valve 74, and applying compressed air to the cylinder 43 until the spigot assembly has risen through approximately one inch. The cam-shaft 51 will thus be rotated to release the latches 56 and the aeroplane can be lifted freely and removed.

To enable the releasable attachments herein described to be employed in the performance of experiments intended to measure the response of an aeroplane to different deflections of the control organs, but without actually permitting the aeroplane to take off, means will be provided for preventing the disconnection of the anchorage when the carriage reaches the speed at which the excess lifting force would otherwise operate to release the attachment. In the case of the embodiment illustrated in Figs. 1 and 2 of the drawings it will be sufficient to apply to the upper end of the housing 20 a temporary collar by which the latch segments 25 are prevented from expanding into the position shown in Fig. 2, so that their inwardly facing shoulders 30 remain in engagement with the detent 28 even though the bolt 19 has risen to the release position. In the embodiment shown in Figs. 3 to 7 of the drawings, the nut 82 is unlocked and screwed down the screwed portion 83 of the cam-shaft 51 until it abuts against the handwheel 52; when therefore the spigot assembly is raised by the excess lift on the wings of the aeroplane the cam-shaft 51 will rise under the pressure of the compressed spring 68, but without rotating to actuate the cam 53, the limit of vertical movement of the spigot assembly being reached when the main spring 48 is fully compressed.

What I claim as my invention and desire to secure by Letters Patent is:

1. A releasable attachment comprising a latch adapted to engage a detent on an object and to be disengaged to release said detent, a bolt comprising a head engaged with said latch, and a longitudinally extending shank connected with said head, means for applying to said bolt a loading force tending to urge the latch toward, and to hold it yieldably in, the detent-engaging position, movement retarding means operating independently of said bolt-loading means for retarding the longitudinal movement of the bolt towards the detent-releasing position, said retarding means acting on said bolt to prevent disengagement of said detent until a predetermined external force tending to release the detent and greater than and opposite to said loading force has been applied to the detent for a predetermined period, and means mounting the bolt and latch with freedom to resume their initial, locked positions upon cessation of the externally applied force prior to release of the latch.

2. An attachment according to claim 1, adapted for engagement of a mushroom-shaped detent, comprising a tubular housing in which the bolt and latch are housed, said latch consisting of a plurality of collectively annular segments disposed about a flanged head on the bolt, said segments being constrained by the housing to occupy a position in which they present two spaced inwardly projecting shoulders of which one is received behind the bolt head and the second engages the mushroom-shaped detent, and the arrangement being such that the external force applied to the detent will draw the bolt and latch axially along the housing until, when the latch segments reach the end thereof and are no longer restrained thereby against relatively outward movement, the detent is released.

3. An attachment according to claim 2, wherein the bolt housing encloses a dash-pot arranged to retard the axial movement of the bolt towards the detent-released position to a maximum speed predetermined by the adjustment of the dash-pot, but to permit free movement of the bolt in the opposite direction.

4. An attachment according to claim 1, adapted for engagement of a detent consisting of a socket having an inwardly projected rim, wherein the bolt comprises an assembly including a spigot adapted to fit axially in said socket, wherein the latch consists of a plurality of members mounted slidably in the spigot into or out of engagement with the socket rim, and wherein the latch members are operated by a cam which is actuated by the movement of said spigot assembly under the external force applied to said socket.

5. An attachment according to claim 4, comprising a piston slidable in a cylindrical housing, a rigid connection between said piston and the spigot, spring means within the housing for applying the loading force to the bolt assembly, a quick-thread nut mounted co-axially in the piston with the ability to rotate relatively thereto in one direction, a shaft extending axially through the housing and having a male thread mating with the female thread of said nut so that the latter being held against rotation the shaft will be rotated by axial movement of the piston and spigot assembly under an external force applied to the socket, and means locking the shaft against axial movement, the cam being fixed on the shaft and the arrangement being such that after the spring has been compressed by the piston to a predetermined extent the rotation of the cam-shaft suffices to permit retraction of the latch-members and release of the socket.

6. An attachment according to claim 5, comprising means whereby, when the latch members are retracted, the spigot and piston assembly are immediately withdrawn into the tubular housing.

7. An attachment according to claim 6, comprising means for admitting fluid pressure to the underside of the piston to restore the latter, together with the spigot assembly, to its initial loaded position preparatory to re-engagement with the detent socket.

BARNES NEVILLE WALLIS.

References Cited in the file of this patent

UNITED STATES PATENTS

| Number | Name | Date |
|---|---|---|
| 2,165,954 | Bird et al. | July 11, 1939 |
| 2,414,023 | Cooper | Jan. 7, 1947 |
| 2,424,215 | Anderson | July 22, 1947 |
| 2,444,919 | Cotton et al. | July 13, 1948 |

FOREIGN PATENTS

| Number | Country | Date |
|---|---|---|
| 489,890 | Canada | Nov. 30, 1950 |